(12) United States Patent
Smith, III

(10) Patent No.: US 8,087,700 B2
(45) Date of Patent: Jan. 3, 2012

(54) HYDRAULIC COUPLING MEMBER WITH BIDIRECTIONAL PRESSURE-ENERGIZED PROBE SEAL

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 241 days.

(21) Appl. No.: 12/413,281

(22) Filed: Mar. 27, 2009

(65) Prior Publication Data
US 2010/0244431 A1 Sep. 30, 2010

(51) Int. Cl.
*F16L 17/00* (2006.01)
(52) U.S. Cl. ..... 285/111; 285/374; 277/626; 251/149.6; 137/614.04
(58) Field of Classification Search ..... 285/99, 285/111, 110, 109, 95, 374; 277/612, 615, 277/626; 251/149.6, 149.7; 137/614.04
See application file for complete search history.

(56) References Cited

U.S. PATENT DOCUMENTS

| | | | | |
|---|---|---|---|---|
| 2,512,999 | A | * | 6/1950 | Bruning ..... 285/99 |
| 2,659,440 | A | * | 11/1953 | Osmun ..... 285/111 |
| 3,428,340 | A | * | 2/1969 | Pelton ..... 285/95 |
| 3,575,432 | A | * | 4/1971 | Taylor ..... 285/367 |
| 3,857,572 | A | * | 12/1974 | Taylor et al. ..... 285/110 |
| 3,879,043 | A | | 4/1975 | Tozer |
| 4,371,179 | A | * | 2/1983 | Bohman ..... 285/110 |
| 4,457,523 | A | * | 7/1984 | Halling et al. ..... 277/644 |
| 4,694,859 | A | | 9/1987 | Smith, III |
| 4,709,726 | A | | 12/1987 | Fitzgibbons |
| 4,799,512 | A | * | 1/1989 | Sarson ..... 285/226 |
| 4,817,668 | A | | 4/1989 | Smith, III |
| 5,029,613 | A | | 7/1991 | Smith, III |
| 5,099,882 | A | | 3/1992 | Smith, III |
| 5,203,374 | A | | 4/1993 | Smith, III |
| 5,339,861 | A | | 8/1994 | Smith, III |
| 5,355,909 | A | | 10/1994 | Smith, III |
| 5,762,106 | A | | 6/1998 | Smith, III |
| 5,810,048 | A | * | 9/1998 | Zeiner-Gundersen ... 137/614.04 |

(Continued)

FOREIGN PATENT DOCUMENTS
DE 2410149 A1 9/1975
(Continued)

*Primary Examiner* — David E Bochna
(74) *Attorney, Agent, or Firm* — Wong, Cabello, Lutsch, Rutherford & Brucculeri, L.L.P.

(57) ABSTRACT

A female hydraulic coupling member includes a bidirectional, pressure-energized probe seal for sealing between the body of the female coupling member and the cylindrical probe section of a male coupling member seated in the receiving chamber of the female member. In one embodiment, the pressure-energized seal comprises a first curved section which is oriented towards the external end of the receiving chamber in which it is installed and a second curved section oriented towards the interior end of the receiving chamber. The two curved sections are joined by a substantially straight back section. When the pressure of fluid within the coupling member is above the ambient fluid pressure, the first curved section is pressure-energized so as to increase its sealing effectiveness. When external pressure (e.g., the hydrostatic head) exceeds the pressure of fluid within the coupling member, the second curved section is pressure-energized so as to increase its sealing effectiveness. In another embodiment, the pressure-energized seal comprises a curved back section joining the first curved section and the second curved section. When the curved back section moves radially outward against a circumferential wall under the influence of fluid pressure within the seal, it effects a slight rotation of the first and second curved sections, thereby increasing their sealing effectiveness.

20 Claims, 9 Drawing Sheets

U.S. PATENT DOCUMENTS

| | | |
|---|---|---|
| 5,979,499 A | 11/1999 | Smith |
| 6,123,104 A * | 9/2000 | Smith, III .................. 285/110 |
| 6,511,043 B2 * | 1/2003 | Smith, III .................. 251/149.6 |
| 6,612,030 B2 * | 9/2003 | Halling ..................... 29/888.3 |
| 6,962,347 B2 | 11/2005 | Smith, III |
| 7,021,677 B2 | 4/2006 | Smith, III |
| 7,063,328 B2 | 6/2006 | Smith, III |
| 7,163,190 B2 | 1/2007 | Smith, III |
| 7,303,194 B2 | 12/2007 | Smith, III |
| 2009/0200793 A1 | 8/2009 | Smith, III |

FOREIGN PATENT DOCUMENTS

| | | |
|---|---|---|
| GB | 2201212 A | 8/1988 |
| GB | 2415233 A | 12/2005 |
| GB | 2457149 A | 8/2009 |

* cited by examiner

HYDRAULIC COUPLING MEMBER WITH BIDIRECTIONAL PRESSURE-ENERGIZED PROBE SEAL

CROSS-REFERENCE TO RELATED APPLICATIONS

None

STATEMENT REGARDING FEDERALLY SPONSORED RESEARCH OR DEVELOPMENT

Not Applicable

BACKGROUND OF THE INVENTION

1. Field of the Invention

This invention relates to hydraulic coupling members. More particularly, it relates to subsea female coupling members having pressure-energized probe seals.

2. Description of the Related Art Including Information Disclosed Under 37 CFR §1.97 and §1.98.

A hydraulic coupling is typically comprised of two members—a male member having a probe section and a female member having a receiving chamber. When the hydraulic coupling is made up, the probe section of the male member engages seals within the receiving chamber of the female member to provide a fluid-tight connection.

A variety of subsea hydraulic coupling members having pressure-energized probe seals are known in the art.

U.S. Pat. No. 4,694,859 discloses an undersea hydraulic coupling and metal seal, primarily for use in undersea hydraulic applications. The female member of the coupling is of three-piece construction. The main body portion accepts a cylindrical retainer which is held captive within the body by means of a spring clip or snap ring. The metal seal is generally ring-shaped and is positioned within the body and held captive by the retainer and clip. The male member, or probe, of the coupling fits within the retainer and body and protrudes through the ring of the metal seal. The seal engages the circumference of the probe and, when the coupling is pressurized, the seal is urged against the probe circumference and against the interior wall of the body, effectuating a fluid seal within the coupling. The metal seal is not irrevocably deformed in use and may be used repeatedly.

U.S. Pat. No. 4,817,668 discloses an integral metal-to-metal seal for a subsea hydraulic connector, the seal having a concave leading face extending from the male member body, the concave leading face having a flexible outer rim which seals against the wall of the female member bore. The outer rim is biased against the wall of the female member bore, and further is responsive to hydraulic pressure to flex against the wall of the female member bore.

U.S. Pat. No. 5,029,613 discloses a hydraulic coupling having a seal member with an annular flexible metal seal surface for sealing with a male member or probe. The metal seal surface is integral with the seal member and extends into the bore of the female member. The metal seal surface is urged radially inwardly against the male member in response to internal fluid pressure in the coupling.

U.S. Pat. Nos. 5,099,882 and 5,203,374 disclose a pressure-balanced hydraulic coupling for use in undersea drilling and production operations. The coupling has radial passageways communicating between the male and female members such that substantial fluid pressure is not exerted against the face of either member during coupling or uncoupling or during the coupled state. Check valves in both the male and female members are opened when the male member probe is fully inserted into the receiving chamber of the female member. Mutually opposed valve actuators contact one another to effectuate the simultaneous opening of each check valve, and allow fluid to flow through a valve port and then radially through matching fluid passageways in the male and female members. The radial passageways of the male and female members match up at their longitudinal surfaces so that fluid pressure between the male and female members is in a substantially radial direction and is not exerted at the face of either member. A first pair of seals is positioned on each side of the radial passage for sealing between the receiving chamber and the seal retainer. A second pair of seals is positioned on each side of the radial passage for sealing between the seal retainer and the male member. The seals are pressure-energized metal seals.

U.S. Pat. No. 5,339,861 discloses an undersea hydraulic coupling with a hollow metal O-ring seal for sealing between the male and female members. The hollow metal O-ring seal is held captive between an internal shoulder and a retainer insertable into the internal bore of the female member. The retainer may be slidable to compress the metal O-ring seal axially. The metal O-ring seal also may be pressure-energized to expand the seal cavity in response to fluid pressure in the coupling.

U.S. Pat. No. 5,355,909 discloses an undersea hydraulic coupling having a pair of hollow metal seals which are pressure energized to seal between the male and female members of the coupling. One of the hollow metal seals is configured to expand radially while the second hollow metal seal is compressible along the longitudinal axis of the coupling. These seals provide a fluid tight sealing arrangement upon pressurization of the coupling, without the need for external pre-load devices.

U.S. Pat. No. 5,762,106 discloses a coupling and metal seal primarily for use in undersea hydraulic applications. The female member of the coupling is of three-piece construction. The main body portion accepts a cylindrical retainer which is held captive within the body by means of a spring clip or snap ring. The metal seal is generally ring-shaped and is positioned within the body and held captive by the retainer and clip. The male member, or probe, of the coupling fits within the retainer and body and protrudes through the ring of the metal seal. The seal engages the circumference of the probe and, when the coupling is pressurized, the seal is urged against the probe circumference and against the interior wall of the body, effectuating a fluid seal within the coupling. The metal seal is not irrevocably deformed in use and may be used repeatedly U.S. Pat. No. 5,979,499 discloses an undersea hydraulic coupling having a ring-shaped metal seal that is held in place between the female member body and a sleeve-shaped seal retainer. The annular metal seal includes a lip or leg section which is clamped in place between the female member body and the seal retainer. A hollow portion of the seal extends radially inwardly from the lip portion of the seal and is expansible to form a fluid tight seal against the body of the male member. The hollow portion of the metal seal is preferably cylindrical in cross-section and is sufficiently flexible in response to fluid pressure to form a fluid tight seal between the female member, male member, and seal retainer.

U.S. Pat. No. 7,063,328 discloses an undersea hydraulic coupling member with a seal retainer that holds and secures a plurality of annular seals that may be removed from the coupling member together with the seal retainer. At least one of the seals is a pressure energized hollow metal seal. The seal retainer includes a shell that engages the coupling member and a seal carrier that holds the annular seals.

U.S. Pat. No. 7,303,194 discloses an improved seal retainer for an undersea hydraulic coupling member which utilizes pressure-energized metal seals to maintain fluid integrity. One or more metal seals designed to have a press or interference fit are utilized in such a way that pressurized fluid trying to escape past the seal actually helps to pressure-energize the seal to ensure a better seal.

U.S. Pat. No. 6,962,347 discloses a backup, metal, O-ring seal that is retained around the outer diameter of a seal retainer of an undersea hydraulic coupling member to seal a leak path around the seal retainer. The metal O-ring seal may be seated on a shoulder on the seal retainer. The backup metal seal is effective for high temperature and high pressure applications.

BRIEF SUMMARY OF THE INVENTION

A female hydraulic coupling member includes a bidirectional, pressure-energized probe seal for sealing between the body of the female coupling member and the cylindrical surface of the probe section of a male coupling member seated in the receiving chamber of the female member.

In a first embodiment, the pressure-energized seal comprises a first curved section oriented towards the external end of the receiving chamber and a second curved section oriented towards the interior end of the receiving chamber. The two curved sections are joined by a substantially straight back section.

When the pressure of the hydraulic fluid within the coupling member is above the ambient fluid pressure, the first curved section is pressure-energized so as to increase its sealing effectiveness. When external pressure (e.g., the hydrostatic head) exceeds the pressure of the hydraulic fluid within the coupling member, the second curved section is pressure-energized so as to increase its sealing effectiveness.

In a second embodiment, the pressure-energized seal comprises a curved back section joining the first curved section and the second curved section. When fluid pressure within the cavity of the seal urges the curved back section radially outward against a circumferential wall, it effects a slight rotation of the first and second curved sections, thereby increasing their sealing effectiveness.

BRIEF DESCRIPTION OF THE SEVERAL VIEWS OF THE DRAWING(S)

DETAILED DESCRIPTION OF THE INVENTION

Figure 1:
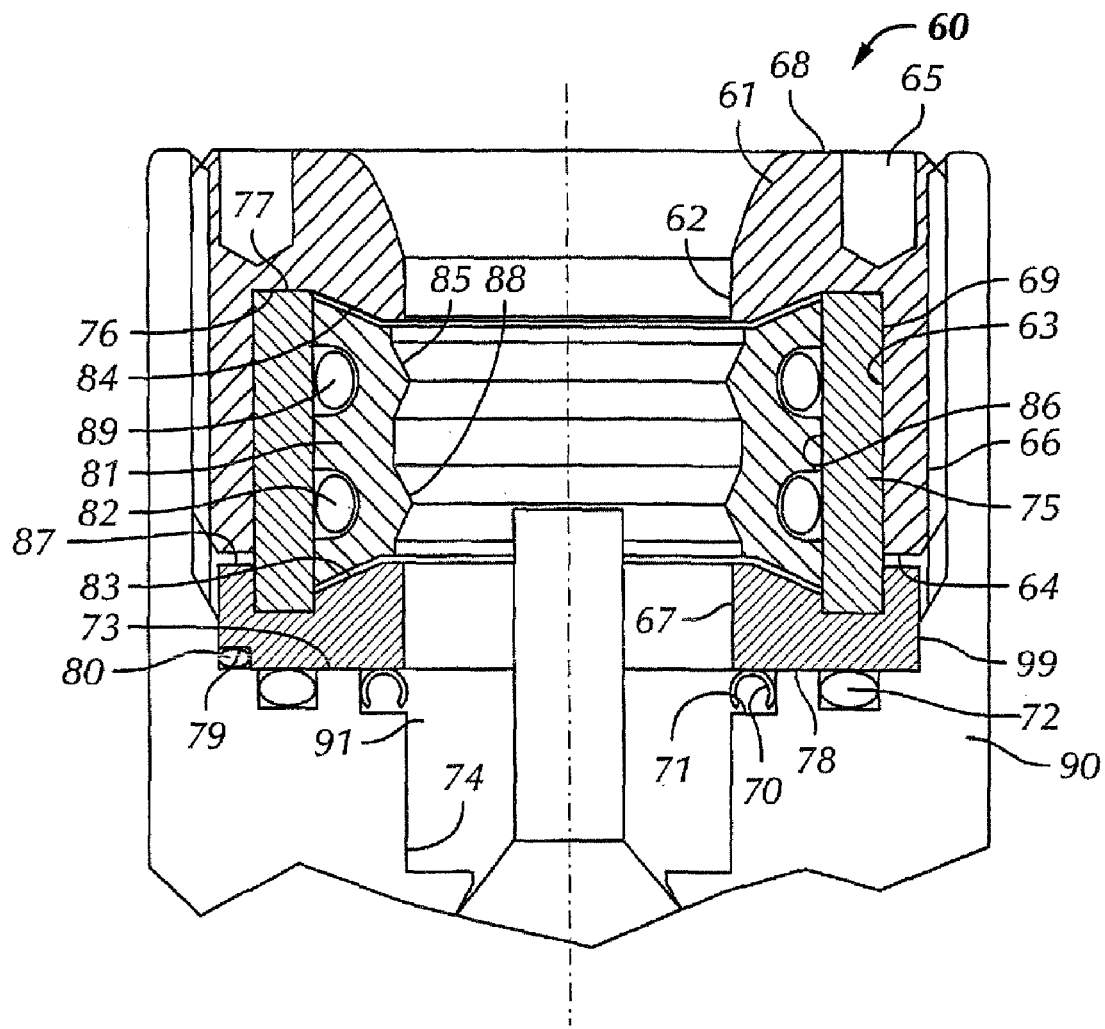
FIG. 1 is a cross-sectional view of a portion of a female coupling member having a pressure-energized probe seal according to the prior art.

The receiving-chamber end of a female hydraulic coupling member of the prior art is shown in FIG. 1. Seal retainer 60 retains primary metal seal 70 and back-up metal seal 80 in the receiving chamber 91 of female coupling member 90. In this coupling, the primary metal seal is a hollow, pressure-energized, metal seal with a C-shaped cross section that is retained on internal shoulder 71 of the receiving chamber. The primary metal seal may be axially compressed slightly by the seal retainer to pre-load the seal, and is pressure energized by hydraulic fluid in the seal cavity to urge the inner diameter radially inwardly farther than the internal diameter of receiving chamber wall 74 to seal with the male coupling member, and the outer diameter radially outwardly to seal against the female coupling member.

A back-up metal seal such as a hollow metal O-ring is seated on shoulder 79 of the seal retainer. The back-up metal seal may be press fitted against the seal retainer so that it can be removed from the receiving chamber together with the seal retainer. The back-up metal seal may be slightly compressed when the seal retainer is fully inserted into the receiving chamber to approach or abut shoulder 73. The compression urges the inner diameter radially inward against the seal retainer and the outer diameter radially outward against the receiving chamber of the female coupling member. The back-up metal seal may have one or more holes therein to allow hydraulic fluid to enter the seal and pressure-energize the seal.

The seal retainer includes shell 61 and seal carrier 75. The shell is a generally ring-shaped body with an outer diameter 66 that may be threaded to engage with the female coupling member. The shell has first end 68, second end 64, first larger inner diameter 63, second smaller inner diameter 62, and internal shoulder 76 between the first and second inner diameters. The shell also includes negative or reverse angle shoulder 84 that extends radially inwardly from internal shoulder 76. Holes 65 are included in the first end of the shell, and a spanner or other tool may be inserted into the holes to rotate the shell to engage or disengage it from the female member.

The seal carrier is a generally ring shaped sleeve, part of which engages or fits at least partially into the shell. The seal carrier has first end 77 which fits into the shell, second end 78, first larger outer diameter 99, second smaller outer diameter 69, first larger inner diameter 86, and second smaller inner diameter 67. The seal carrier may have negative or reverse angle shoulder 83 between the first larger inner diameter and second smaller inner diameter. The seal carrier also may include outer shoulder 87 between the first larger outer diameter and the second smaller outer diameter.

The first end of the seal carrier slides into the first larger inner diameter of 63 of the shell. There may be little or no clearance between the second smaller outer diameter of the seal carrier and the inner diameter of the shell, or there may be a slight interference fit. When the first end of the seal carrier is fully inserted into the shell, the first end 77 abuts internal step 76 of the shell, and second end 64 of the shell abuts outer shoulder 87 of the seal carrier.

In the prior art coupling shown in FIG. 1, seal 72 is an elastomeric O-ring in a groove in shoulder 73 of the receiving chamber. Additionally, the seal retainer holds elastomeric seal 81 between reverse angled shoulders 83 and 84 that restrain the seal from implosion into the central bore. Seal 81 has a dovetail cross section, and has a dovetail interfit between the reverse angled shoulders. The inner diameter of seal 81 has projections 85, 88 that extend farther into the central bore than the smaller inner diameters of the shell or seal carrier to seal radially with the male member when probe section of the male member is in the receiving chamber. O-rings 82, 89 are positioned around the outer diameter of seal 81.

It will be appreciated by those skilled in the art that C-shaped primary metal seal 70 of coupling 60 is configured to be pressure-energized by internal hydraulic pressure within coupling 60—i.e., in order for seal 70 to become pressure-energized, the fluid pressure at receiving chamber wall 74 must be greater than the fluid pressure at shoulder 73. However, as offshore oil exploration and production moves to ever deeper waters, the external pressure can exceed the internal pressure in a subsea hydraulic coupling. Hydraulic couplings are also used within oil and gas wells (such as on tubing hangars) where they are exposed to the pressure of the well fluids. These pressures can exceed the working pressure of the hydraulic fluid within the coupling. In such conditions, seal 70 of coupling 60 would not be pressure-energized and its sealing ability would be diminished. What is needed is a coupling member having pressure-energized seals that are responsive to both positive and negative pressure differentials. The present invention solves this problem.

The invention may best be understood by reference to certain illustrative embodiments which are shown in the drawing figures.

Figure 2A:
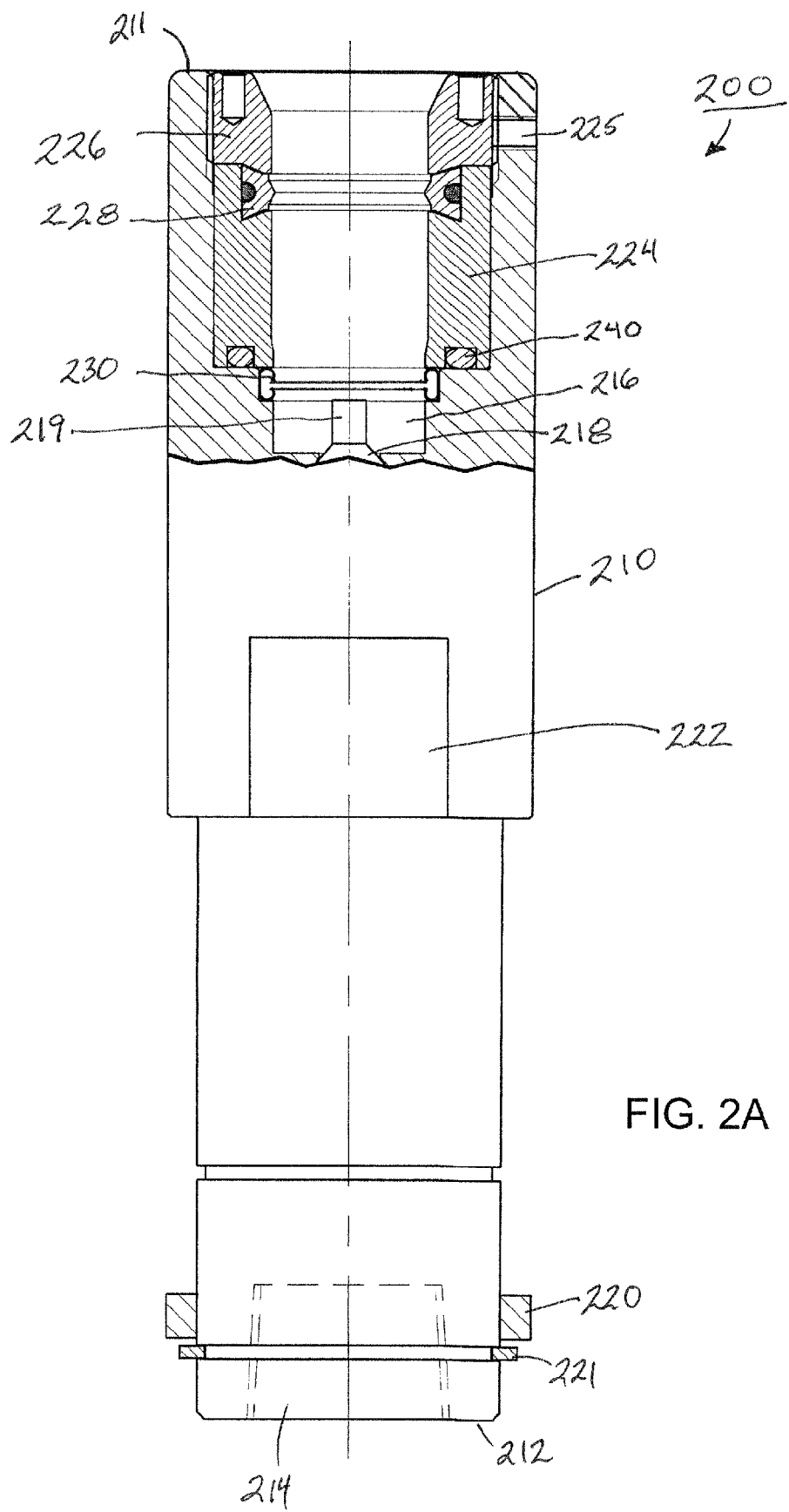
FIG. 2A is a partially cross-sectioned view of a coupling member equipped with a seal retainer and a pressure-energized seal according to a first embodiment.

Referring to FIG. 2A, female hydraulic coupling member 200 comprises generally cylindrical body 210 having a first end 211 and an opposing second end 212. Flange 220 and retaining ring 221 may be provided near end 212 to facilitate mounting coupling 200 in a mounting plate or the like. Internal connector 214 may be provided in end 212 to enable coupling 200 to be connected to a hydraulic fluid line, fitting or the like. In certain embodiments, connector 214 may be internally threaded and wrench flat 222 may be provided on body 210 to facilitate the tightening and removal of coupling 200 from a corresponding threaded connector (not shown).

Coupling body 210 has a central, axial bore which forms receiving chamber 216 proximate first end 211 and provides a fluid path from the receiving chamber 216 to connector 214. Optional poppet valve 218 may be provided to seal hydraulic fluid within the central axial bore and prevent it from leaking out of coupling member 200 when it is disengaged from a corresponding male coupling member. Poppet valve 218 may have valve actuator 219 which is sized and configured to contact a corresponding valve actuator in the male coupling member such that when the probe section of the male coupling member is fully inserted in receiving chamber 216, actuator 219 moves spring-loaded poppet valve 218 to its open position thereby permitting the flow of hydraulic fluid between the two coupling members.

Figure 2B:
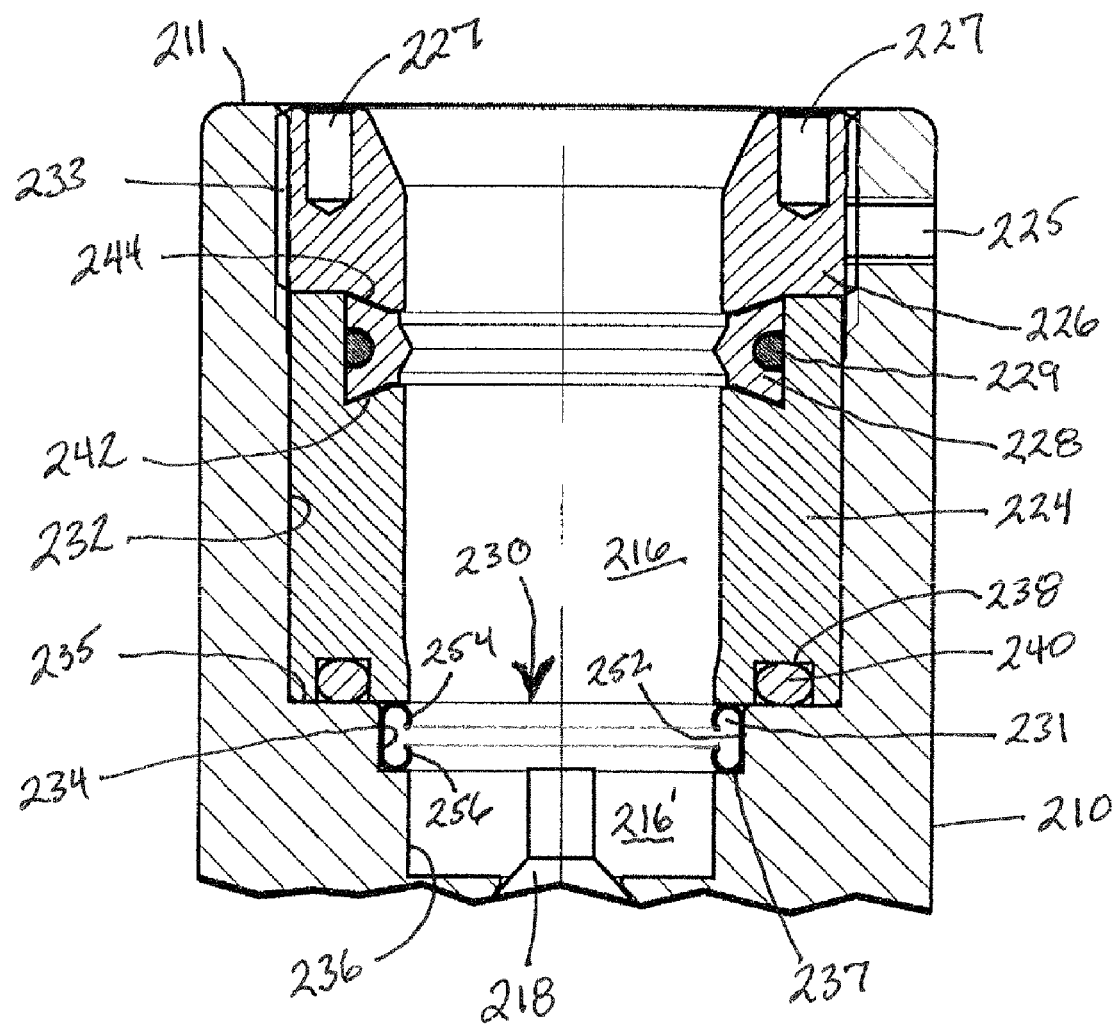
FIG. 2B is an enlargement of the portion of FIG. 2A shown in cross section.

Referring now to FIG. 2B, the central axial bore of coupling member 200 proximate first end 211 comprises a first section having first internal diameter 232. Adjacent this first section is a second section having second internal diameter 234 which is less than first internal diameter 232. Adjacent the second section is a third section having third internal diameter 236 which is less than second internal diameter 234. First shoulder 235 is between the first section and the second section; second shoulder 237 is between the second section and the third section.

Seal retainer 224 is configured to abut first shoulder 235 and is held within body 210 by externally threaded retainer nut 226. Portion 233 of the central axial bore may be internally threaded to engage retainer nut 226. Internally threaded hole 225 may be provided for a set screw (not shown) which may be used to lock retainer nut 226 in place. Spanner holes 227 may be provided on the external end of retainer nut 226 to permit the engagement of a tool for tightening and removing retainer nut 226. The opposing (internal) end of retainer nut 226 may have angled shoulder 244 and the exterior end of seal retainer may have angled shoulder 242. These two angled shoulders engage corresponding shoulders on optional seal 228 to provide a dovetail interfit of seal 228 within coupling member 200. In certain embodiments, optional seal 228 is an elastomeric seal and the dovetail interfit prevents the implosion of seal 228 into receiving chamber 216 when the probe section of a corresponding male coupling member is withdrawn. Seal 228 may be provided with sealing ridge 246 to seal against the probe section of a male member and with O-ring 229 in a groove in its outer circumference which seals to seal retainer 224.

The interior end of seal retainer 224—i.e., the end which abuts shoulder 235—may have annular groove 238 for holding O-ring seal 240. O-ring seal 240 seals between seal retainer 224 and body 210 of coupling member 200.

Pressure-energized seal 230 is generally C-shaped in cross section but, unlike the C-shaped, pressure-energized seals of the prior art (see FIG. 1), is oriented within body 210 such that the opening in the "C" faces the central axis A of receiving chamber 216.

Pressure-energized seal 230 is sized and configured to be held on shoulder 237 of body 210 by the interior end of seal retainer 224. Seal 230 may be sized such that the interior surfaces of seal 230 project slightly into receiving chamber 216 in order to provide a slight interference fit with the outer cylindrical wall of the probe section of a male coupling member inserted into receiving chamber 216.

Pressure-energized seal 230 comprises first curved section 254 and second curved section 256 which are connected by back section 252 to define interior cavity 231. Second curved section 256 may be a mirror image of first curved section 254.

It will be appreciated by those skilled in the art that when female coupling member 200 is made up with a corresponding male coupling member, the receiving chamber of coupling member 200 is divided by pressure-energized seal 230 into section 216 which is external to seal 230 and section 216' which is internal to seal 230. Depending on the ambient pressure (which may be the hydrostatic head or the pressure of well fluids within a well casing) and the pressure of hydraulic fluid within the system, the pressure in section 216' may be greater than or less than the pressure in section 216.

If the pressure within section 216' exceeds that within section 216, first section 254 of seal 230 will be pressure-energized by hydraulic fluid in cavity 231 to seal against the probe section of the male coupling member. Conversely, if the pressure within section 216 is greater than that within section 216', seawater or well fluids which may leak past seals 228, 229 and/or seal 240 and thereby enter cavity 231 will pressure-energize section 256 of seal 230 to seal more firmly against the probe section of the male coupling member.

Pressure-energized seal 230 may be made of any suitable material. In one particular preferred embodiment, seal 230 is a metal seal. In other embodiments, seal 230 is fabricated from a natural or synthetic polymer. An engineering plastic such as polyetheretherketone (PEEK) or polytetrafluoroethylene (PTFE; Teflon™) may be molded and/or machined to fabricate seal 230. In certain embodiments, seal 230 may be plated or otherwise coated with a corrosion-resistant material to prolong the working life of seal 230 in the subsea environment. In one particular preferred embodiment, seal 230 is a metal seal plated with gold. Gold is both resistant to corrosion and relatively soft. A softer metal can deform under pressure to conform to surface irregularities on an opposing harder surface and thereby provide a better seal.

Figure 3A:
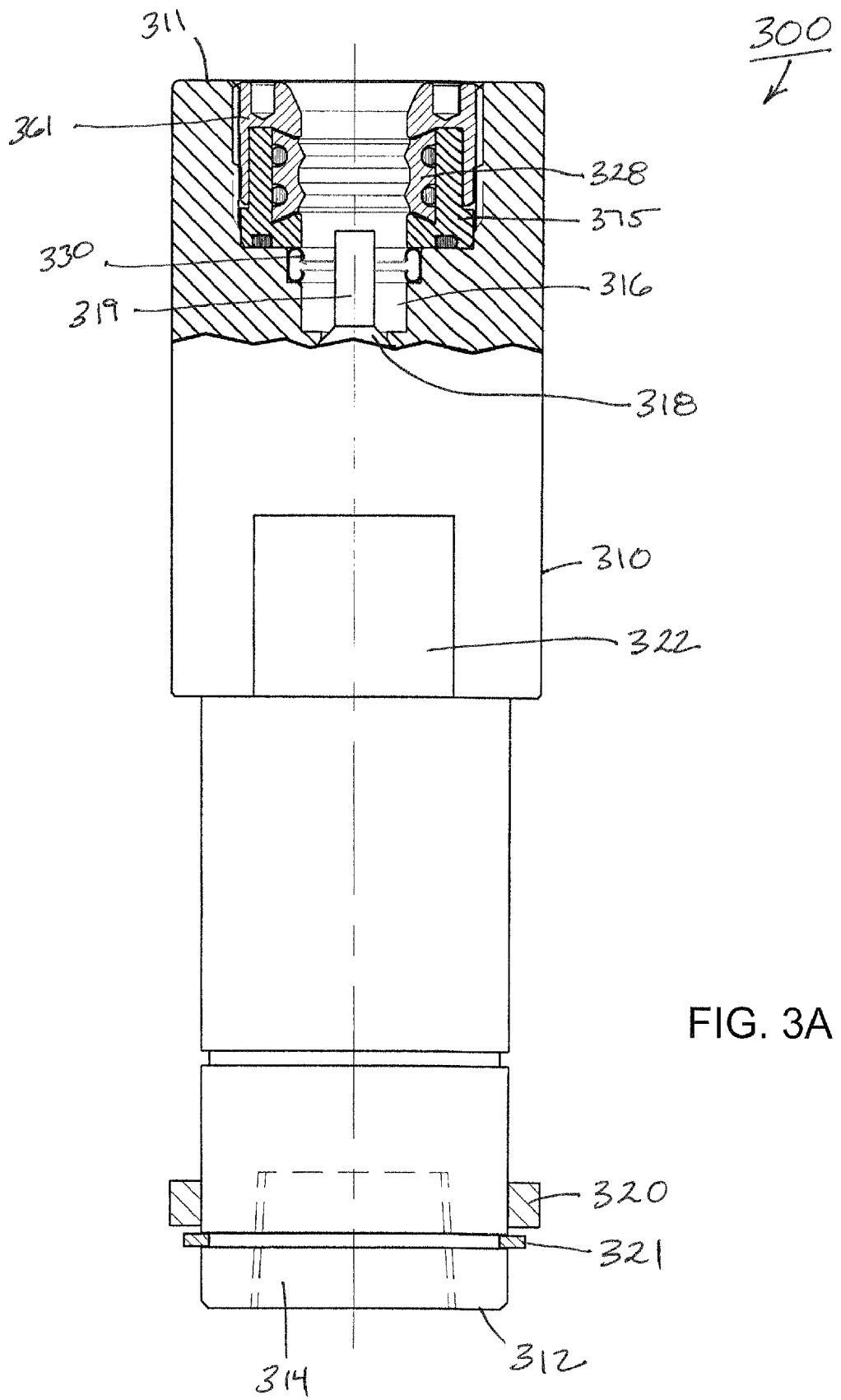
FIG. 3A is a partially cross-sectioned view of a coupling member equipped with a seal cartridge and a pressure-energized seal according to a first embodiment.

FIG. 3A illustrates an embodiment comprising a seal cartridge. Female hydraulic coupling member 300 comprises generally cylindrical body 310 having a first end 311 and an opposing second end 312. Flange 320 and retaining ring 321 may be provided near end 312 to facilitate mounting coupling 300 in a mounting plate or the like. Internal connector 314 may be provided in end 312 to enable coupling 300 to be connected to a hydraulic fluid line, fitting or the like. In certain embodiments, connector 314 may be internally threaded and wrench flat 322 may be provided on body 310 to facilitate the tightening and removal of coupling 300 from a corresponding threaded connector (not shown).

Coupling body 310 has a central, axial bore which forms receiving chamber 316 proximate first end 311 and provides a fluid path from the receiving chamber 316 to connector 314. Optional poppet valve 318 may be provided to seal hydraulic fluid within the central axial bore and prevent it from leaking out of coupling member 300 when it is disengaged from a corresponding male coupling member. Poppet valve 318 may have valve actuator 319 which is sized and configured to contact a corresponding valve actuator in the male coupling member such that when the probe section of the male coupling member is fully inserted in receiving chamber 316, actuator 319 moves spring-loaded poppet valve 318 to its open position thereby permitting the flow of hydraulic fluid between the two coupling members.

Figure 3B:
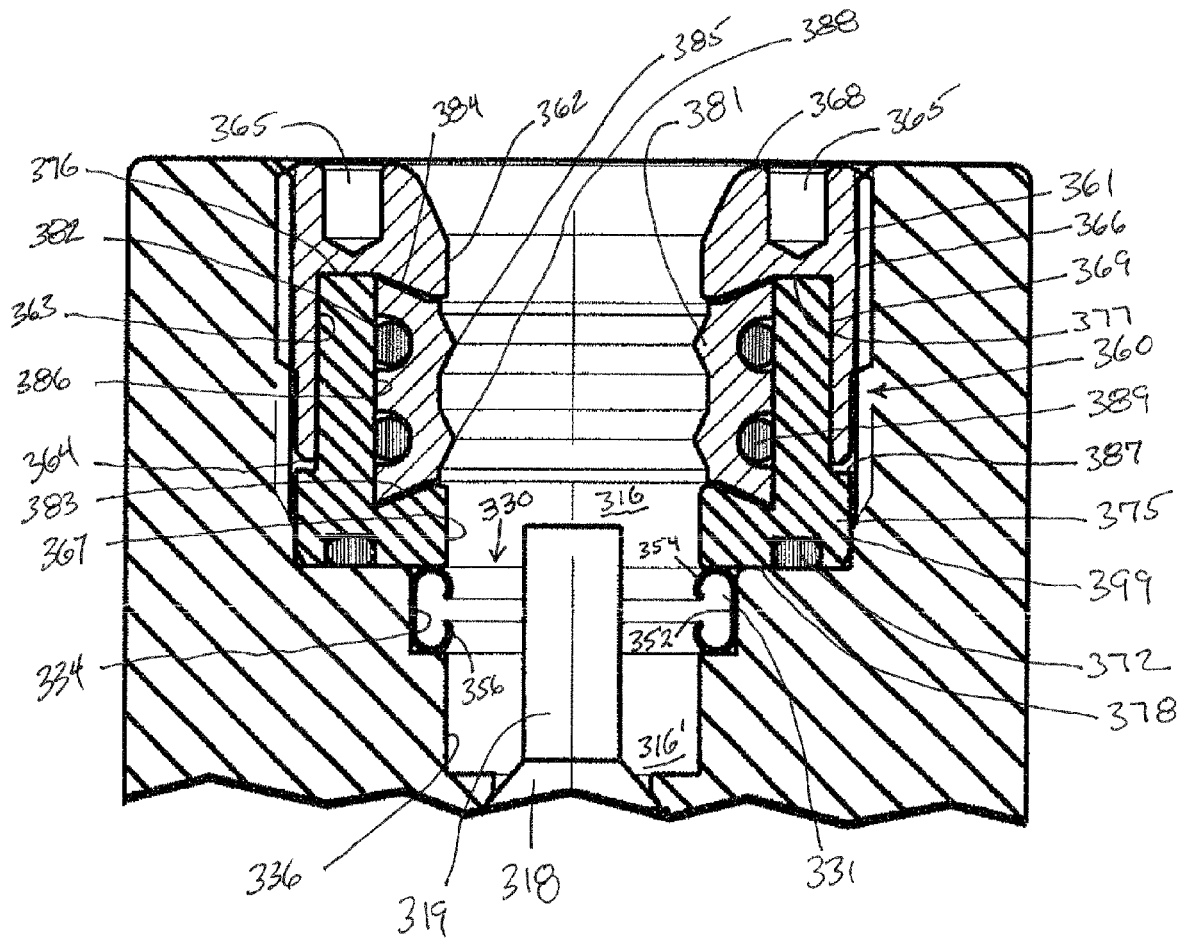
FIG. 3B is an enlargement of the portion of FIG. 3A shown in cross section.

Referring now to FIG. 3B, the central axial bore of coupling member 300 proximate first end 311 comprises a first section having first internal diameter 332. Adjacent this first section is a second section having second internal diameter 334 which is less than first internal diameter 332. Adjacent the second section is a third section having third internal diameter 336 which is less than second internal diameter 334. First shoulder 335 is between the first section and the second section; second shoulder 337 is between the second section and the third section.

Seal cartridge 360 includes shell 361 and seal carrier 375. The shell is a generally ring-shaped body with an outer diameter 366 that may be threaded to engage with the female coupling member. The shell has first end 368, second end 364, first larger inner diameter 363, second smaller inner diameter 362, and internal shoulder 376 between the first and second inner diameters. The shell also includes negative or reverse angle shoulder 384 that extends radially inwardly from internal shoulder 376. Holes 365 are included in the first end of the shell, and a spanner or other tool may be inserted into the holes to rotate the shell to engage or disengage it from the female member.

The seal carrier 375 is a generally ring shaped sleeve, part of which engages or fits at least partially into the shell 361. The seal carrier has first end 377 which fits into the shell, second end 378, first larger outer diameter 399, second smaller outer diameter 369, first larger inner diameter 386, and second smaller inner diameter 367. The seal carrier may have negative or reverse angle shoulder 383 between the first larger inner diameter and second smaller inner diameter. The seal carrier also may include outer shoulder 387 between the first larger outer diameter and the second smaller outer diameter.

The first end of the seal carrier slides into the first larger inner diameter of 363 of the shell. There may be little or no clearance between the second smaller outer diameter of the seal carrier and the inner diameter of the shell, or there may be a slight interference fit. When the first end of the seal carrier is fully inserted into the shell, the first end 377 abuts internal step 376 of the shell, and second end 364 of the shell abuts outer shoulder 387 of the seal carrier.

In the female coupling member shown in shown in FIGS. 3A and 3B, seal 372 is an elastomeric O-ring in a groove in end 378 of seal carrier 375. Additionally, the seal retainer holds elastomeric crown seal 381 between reverse angled shoulders 383 and 384 that restrain the crown seal from implosion into the central bore. Seal 381 has a dovetail cross section, and has a dovetail interfit between the reverse angled shoulders. The inner diameter of seal 381 has projections 385, 388 that extend farther into the central bore than the smaller inner diameters of the shell or seal carrier to seal radially with the male member when probe section of the male member is in the receiving chamber. O-rings 382, 389 may be positioned around the outer diameter of seal 381.

Pressure-energized seal 330 is generally C-shaped in cross section but, unlike the C-shaped, pressure-energized seals of the prior art (see FIG. 1), is oriented within body 310 such that the opening in the "C" faces the central axis A of receiving chamber 316.

Pressure-energized seal 330 is sized and configured to be held on shoulder 337 of body 310 by the interior end of seal retainer 324. Seal 330 may be sized such that the interior surfaces of seal 330 project slightly into receiving chamber 316 in order to provide a slight interference fit with the outer cylindrical wall of the probe section of a male coupling member inserted into receiving chamber 316.

Pressure-energized seal 330 comprises first curved section 354 and second curved section 356 which are connected by back section 352 to define interior cavity 331. Second curved section 356 may be a mirror image of first curved section 354.

It will be appreciated by those skilled in the art that when female coupling member 300 is made up with a corresponding male coupling member, the receiving chamber of coupling member 300 is divided by pressure-energized seal 330 into section 316 which is external to seal 330 and section 316' which is internal to seal 330. Depending on the ambient pressure (which may be the hydrostatic head or the pressure of well fluids within a well casing) and the pressure of hydraulic fluid within the system, the pressure in section 316' may be greater than or less than the pressure in section 316.

If the pressure within section 316' exceeds that within section 316, first section 354 of seal 330 will be pressure-energized by hydraulic fluid in cavity 331 to seal against the probe section of the male coupling member. Conversely, if the pressure within section 316 is greater than that within section 316', seawater or well fluids which may leak past seals 328, 329 and/or seal 340 and thereby enter cavity 331 will pressure-energize section 356 of seal 330 to seal more firmly against the probe section of the male coupling member.

Pressure-energized seal 330 may be made of any suitable material. In one particular preferred embodiment, seal 330 is a metal seal. In other embodiments, seal 330 is fabricated from a natural or synthetic polymer. An engineering plastic such as polyetheretherketone (PEEK) or polytetrafluoroethylene (PTFE; Teflon™) may be molded and/or machined to fabricate seal 330. In certain embodiments, seal 330 may be plated or otherwise coated with a corrosion-resistant material to prolong the working life of seal 330 in the subsea environment. In one particular preferred embodiment, seal 330 is a metal seal plated with gold. Gold is both resistant to corrosion and relatively soft. A softer metal can deform under pressure to conform to surface irregularities on an opposing harder surface and thereby provide a better seal.

Figure 4A:
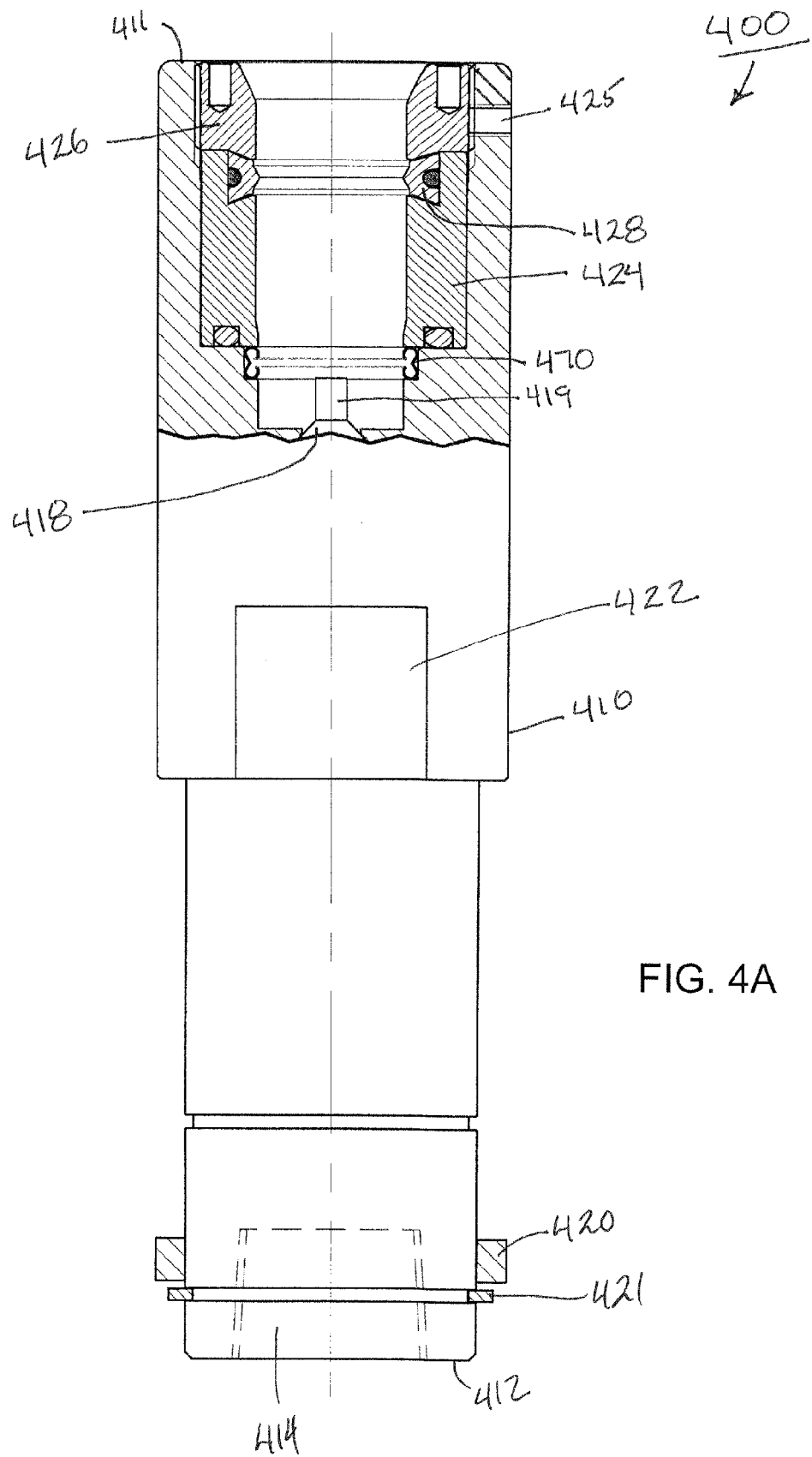
FIG. 4A is a partially cross-sectioned view of a coupling member equipped with a seal retainer and a pressure-energized seal according to a second embodiment.

FIGS. 4 and 5 illustrate coupling members that comprise a bidirectional, pressure-energized seal according to a second embodiment of the invention. Referring to FIG. 4A, female hydraulic coupling member 400 comprises generally cylindrical body 410 having a first end 411 and an opposing second end 412. Flange 420 and retaining ring 421 may be provided near end 412 to facilitate mounting coupling 400 in a mounting plate or the like. Internal connector 414 may be provided in end 412 to enable coupling 400 to be connected to a hydraulic fluid line, fitting or the like. In certain embodiments, connector 414 may be internally threaded and wrench flat 422 may be provided on body 410 to facilitate the tightening and removal of coupling 400 from a corresponding externally threaded connector (not shown).

Coupling body 410 has a central, axial bore which forms receiving chamber 416 proximate first end 411 and provides a fluid path from the receiving chamber 416 to connector 414. Optional poppet valve 418 may be provided to seal hydraulic fluid within the central axial bore and prevent it from leaking out of coupling member 400 when it is disengaged from a corresponding male coupling member. Poppet valve 418 may have valve actuator 419 which is sized and configured to contact a corresponding valve actuator in the male coupling member such that when the probe section of the male coupling member is fully inserted in receiving chamber 416, actuator 419 moves spring-loaded poppet valve 418 to its open position thereby permitting the flow of hydraulic fluid between the two coupling members.

Figure 4B:
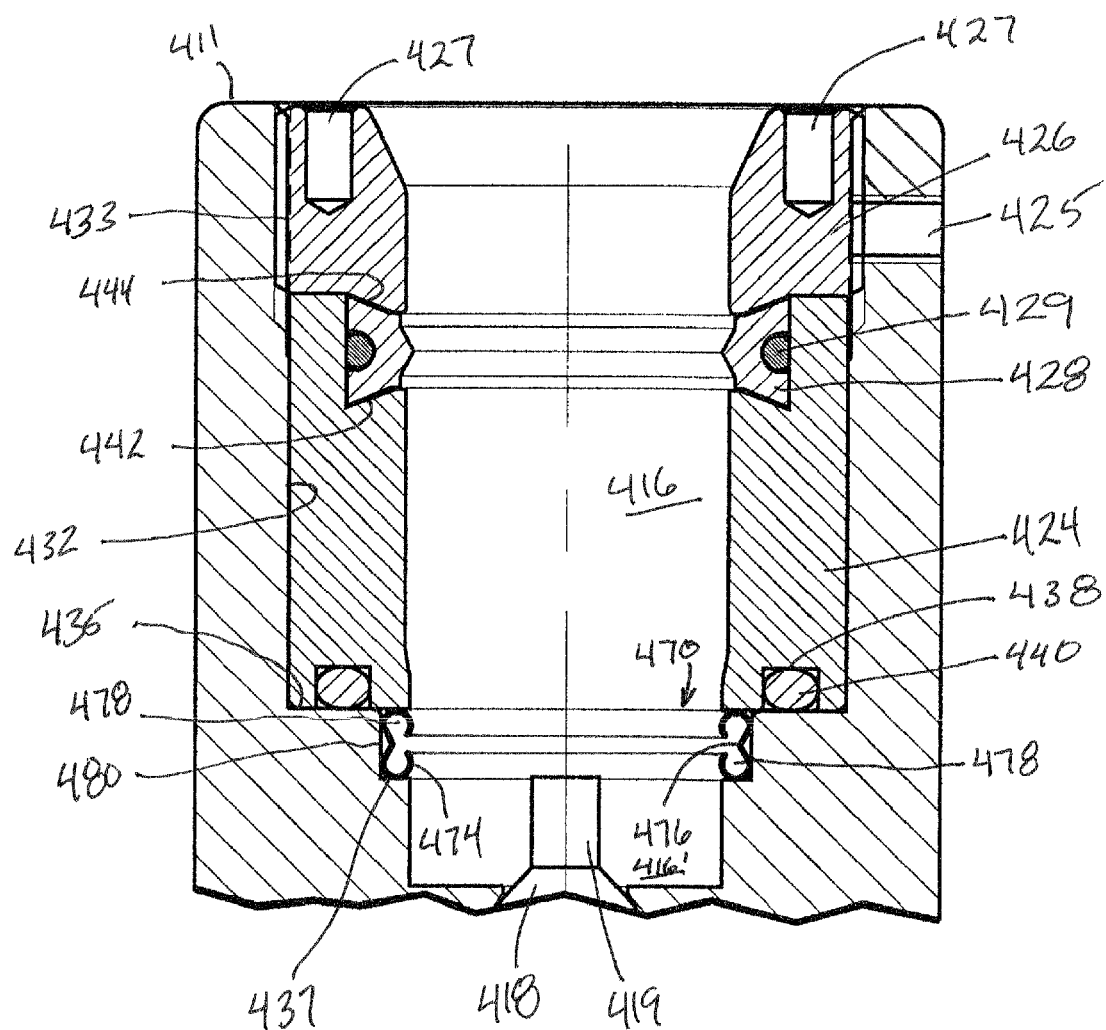
FIG. 4B is an enlargement of the portion of FIG. 4A shown in cross section.

Referring now to FIG. 4B, the central axial bore of coupling member 400 proximate first end 411 comprises a first section having first internal diameter 432. Adjacent this first section is a second section having second internal diameter 434 which is less than first internal diameter 432. Adjacent the second section is a third section having third internal diameter 436 which is less than second internal diameter 434. First shoulder 435 is between the first section and the second section; second shoulder 437 is between the second section and the third section.

Seal retainer 424 is configured to abut first shoulder 435 and is held within body 410 by externally threaded retainer nut 426. Internally threaded hole 425 may be provided for a set screw (not shown) which may be used to lock retainer nut 426 in place. Portion 433 of the central axial bore may be internally threaded to engage retainer nut 426. Spanner holes 427 may be provided on the external end of retainer nut 426 to permit the engagement of a tool for tightening and removing retainer nut 426. The opposing (internal) end of retainer nut 426 may have angled shoulder 444 and the exterior end of the seal retainer may have angled shoulder 442. These two angled shoulders engage corresponding shoulders on optional seal 428 to provide a dovetail interfit of seal 428 within coupling member 400. In certain embodiments, optional seal 428 is an elastomeric seal and the dovetail interfit prevents the implosion of seal 428 into receiving chamber 416 when the probe section of a corresponding male coupling member is withdrawn. Seal 428 may be provided with sealing ridge 446 to seal against the probe section of a male member and with O-ring 429 in a groove in its outer circumference which seals to seal retainer 424.

The interior end of seal retainer 424—i.e., the end which abuts shoulder 435—may have annular groove 438 for holding O-ring seal 440. O-ring seal 440 seals between seal retainer 424 and body 410 of coupling member 400.

Pressure-energized seal 470 is generally ϵ-shaped in cross section but, unlike the C-shaped, pressure-energized seals of the prior art (see FIG. 1), is oriented within body 410 such that the opening in the "ϵ" faces the central axis A of receiving chamber 416.

Pressure-energized seal 470 is sized and configured to be held on shoulder 437 of body 410 by the interior end of seal retainer 424. Seal 470 may be sized such that the interior surfaces of seal 470 project slightly into receiving chamber 416 in order to provide a slight interference fit with the outer cylindrical wall of the probe section of a male coupling member inserted into receiving chamber 416.

Pressure-energized seal 470 comprises first curved section 472 and second curved section 474 which are connected by curved back section 476 to define interior cavity 478. Second curved section 474 may be a mirror image of first curved section 472.

It will be appreciated by those skilled in the art that when female coupling member 400 is made up with a corresponding male coupling member, the receiving chamber of coupling member 400 is divided by pressure-energized seal 470 into section 416 which is external to seal 470 and section 416' which is internal to seal 470. Depending on the ambient pressure (which may be the hydrostatic head or the pressure of well fluids within a well casing) and the pressure of hydraulic fluid within the system, the pressure in section 416' may be greater than or less than the pressure in section 416.

If the pressure within section 416' exceeds that within section 416, first section 472 of seal 470 will be pressure-energized by hydraulic fluid in cavity 478 to seal against the probe section of the male coupling member. Conversely, if the pressure within section 416 is greater than that within section 416', seawater or well fluids which may leak past seals 428, 429 and/or seal 440 and thereby enter cavity 478 will pressure-energize section 474 of seal 470 to seal more firmly against the probe section of the male coupling member.

Fluid pressure within internal cavity 478 will also act to urge curved back section 476 against circumferential wall 480 of the central axial bore. As back 476 moves in a radially outward direction towards wall 480, it causes first curved section 472 and second curved section 474 to rotate slightly thereby increasing the sealing pressure of seal 470 against shoulder 437 and the interior end of seal retainer 424—the end which abuts shoulder 435 of the central axial bore. This rotation may also act to increase the sealing effectiveness of seal 470 to the surface of the cylindrical probe section of a male coupling member seated within receiving chamber 416.

Pressure-energized seal 470 may be made of any suitable material. In one particular preferred embodiment, seal 470 is a metal seal. In other embodiments, seal 470 is fabricated from a natural or synthetic polymer. An engineering plastic such as polyetheretherketone (PEEK) or polytetrafluoroethylene (PTFE; Teflon™) may be molded and/or machined to fabricate seal 470. In certain embodiments, seal 470 may be plated or otherwise coated with a corrosion-resistant material to prolong the working life of seal 470 in the subsea environment. In one particular preferred embodiment, seal 470 is a metal seal plated with gold. Gold is both resistant to corrosion and relatively soft. A softer metal can deform under pressure to conform to surface irregularities on an opposing harder surface and thereby provide a better seal.

Figure 5A:
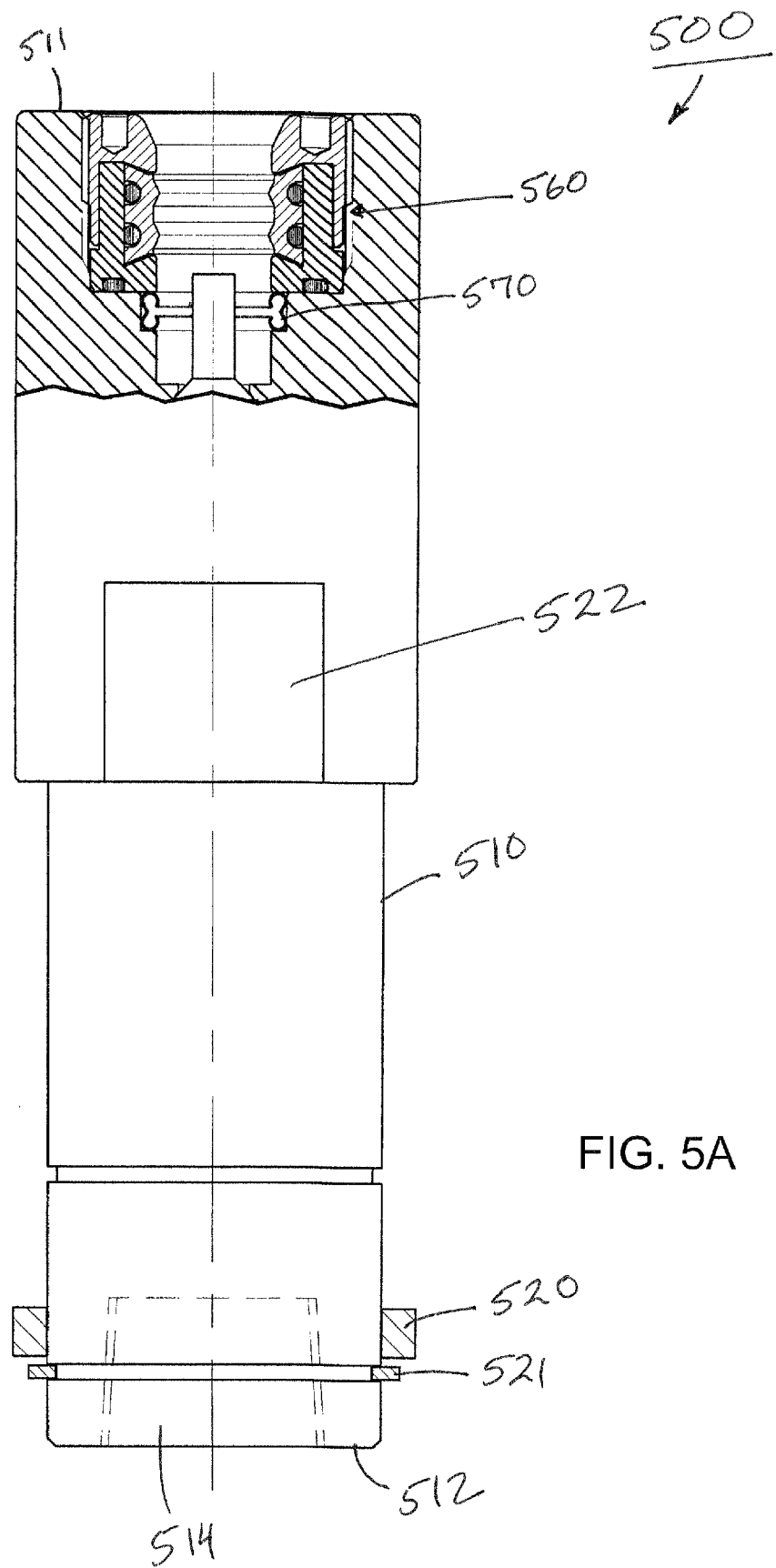
FIG. 5A is a partially cross-sectioned view of a coupling member equipped with a seal cartridge and a pressure-energized seal according to a second embodiment.

FIG. 5A illustrates an embodiment comprising a seal cartridge. Female hydraulic coupling member 500 comprises generally cylindrical body 510 having a first end 511 and an opposing second end 512. Flange 520 and retaining ring 521 may be provided near end 512 to facilitate mounting coupling 500 in a mounting plate or the like. Internal connector 514 may be provided in end 512 to enable coupling 500 to be connected to a hydraulic fluid line, fitting or the like. In certain embodiments, connector 514 may be internally threaded and wrench flat 522 may be provided on body 510 to facilitate the tightening and removal of coupling 500 from a corresponding threaded connector (not shown).

Coupling body 510 has a central, axial bore which forms receiving chamber 516 proximate first end 511 and provides a fluid path from the receiving chamber 516 to connector 514. Optional poppet valve 518 may be provided to seal hydraulic fluid within the central axial bore and prevent it from leaking out of coupling member 500 when it is disengaged from a corresponding male coupling member. Poppet valve 518 may have valve actuator 519 which is sized and configured to contact a corresponding valve actuator in the male coupling member such that when the probe section of the male coupling member is fully inserted in receiving chamber 516, actuator 519 moves spring-loaded poppet valve 518 to its open position thereby permitting the flow of hydraulic fluid between the two coupling members.

Figure 5B:
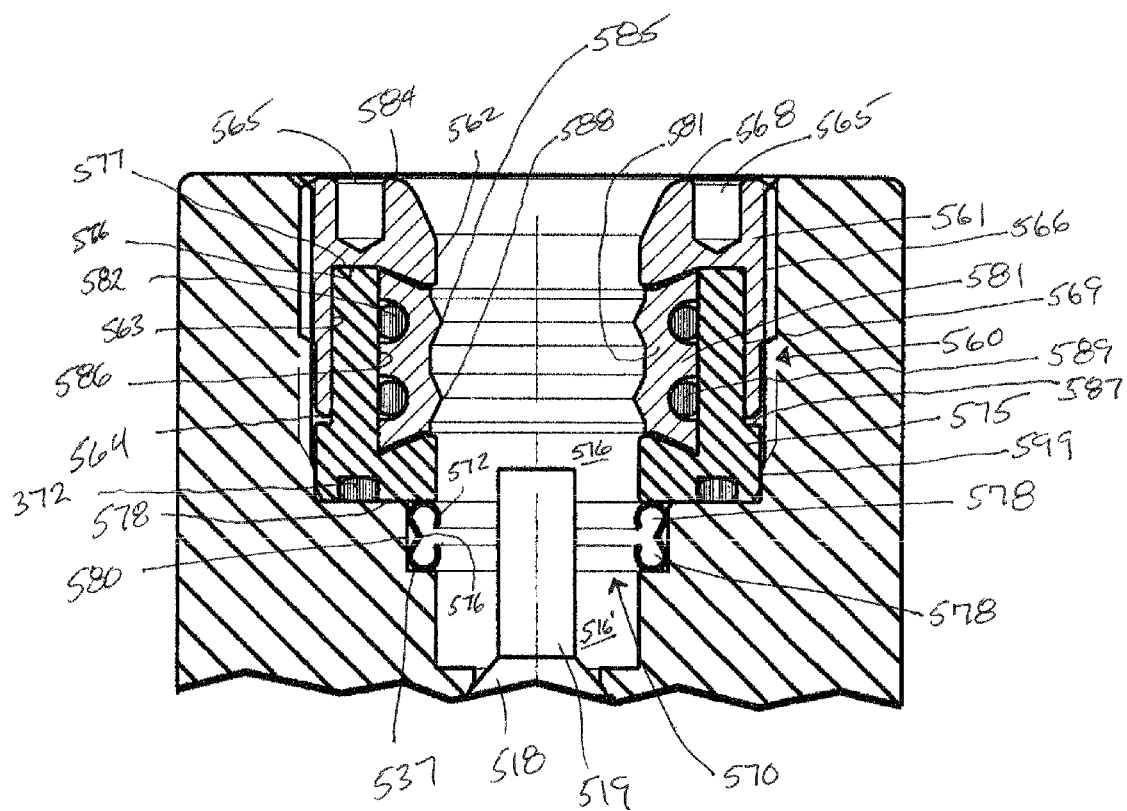
FIG. 5B is an enlargement of the portion of FIG. 5A shown in cross section.

Referring now to FIG. 5B, the central axial bore of coupling member 500 proximate first end 511 comprises a first section having first internal diameter 532. Adjacent this first section is a second section having second internal diameter 534 which is less than first internal diameter 532. Adjacent the second section is a third section having third internal diameter 536 which is less than second internal diameter 534. First shoulder 535 is between the first section and the second section; second shoulder 537 is between the second section and the third section.

Seal cartridge 560 includes shell 561 and seal carrier 575. The shell is a generally ring-shaped body with an outer diameter 566 that may be threaded to engage with the female coupling member. The shell has first end 568, second end 564, first larger inner diameter 563, second smaller inner diameter 562, and internal shoulder 576 between the first and second inner diameters. The shell also includes negative or reverse angle shoulder 584 that extends radially inwardly from internal shoulder 576. Holes 565 are included in the first end of the shell, and a spanner or other tool may be inserted into the holes to rotate the shell to engage or disengage it from the female member.

The seal carrier 575 is a generally ring shaped sleeve, part of which engages or fits at least partially into the shell 561. The seal carrier has first end 577 which fits into the shell, second end 578, first larger outer diameter 599, second smaller outer diameter 569, first larger inner diameter 586, and second smaller inner diameter 567. The seal carrier may have negative or reverse angle shoulder 583 between the first larger inner diameter and second smaller inner diameter. The seal carrier also may include outer shoulder 587 between the first larger outer diameter and the second smaller outer diameter.

The first end of the seal carrier slides into the first larger inner diameter of 563 of the shell. There may be little or no clearance between the second smaller outer diameter of the seal carrier and the inner diameter of the shell, or there may be a slight interference fit. When the first end of the seal carrier is fully inserted into the shell, the first end 577 abuts internal step 576 of the shell, and second end 564 of the shell abuts outer shoulder 587 of the seal carrier.

In the female coupling member shown in shown in FIGS. 5A and 5B, seal 572 is an elastomeric O-ring in a groove in end 578 of seal carrier 575. Additionally, the seal retainer holds elastomeric crown seal 581 between reverse angled shoulders 583 and 584 that restrain the crown seal from implosion into the central bore. Seal 581 has a dovetail cross section, and has a dovetail interfit between the reverse angled shoulders. The inner diameter of seal 581 has projections 585, 588 that extend farther into the central bore than the smaller inner diameters of the shell or seal carrier to seal radially with the male member when probe section of the male member is in the receiving chamber. O-rings 582, 589 may be positioned around the outer diameter of seal 581.

Pressure-energized seal 570 is generally $\epsilon$-shaped in cross section but, unlike the C-shaped, pressure-energized seals of the prior art (see FIG. 1), is oriented within body 510 such that the opening in the "$\epsilon$" faces the central axis A of receiving chamber 516.

Pressure-energized seal 570 is sized and configured to be held on shoulder 537 of body 510 by the interior end of seal retainer 524. Seal 570 may be sized such that the interior surfaces of seal 570 project slightly into receiving chamber 516 in order to provide a slight interference fit with the outer cylindrical wall of the probe section of a male coupling member inserted into receiving chamber 516.

Pressure-energized seal 570 comprises first curved section 572 and second curved section 574 which are connected by curved back section 576 to define interior cavity 579. Second curved section 574 may be a mirror image of first curved section 572.

It will be appreciated by those skilled in the art that when female coupling member 500 is made up with a corresponding male coupling member, the receiving chamber of coupling member 500 is divided by pressure-energized seal 570 into section 516 which is external to seal 570 and section 516' which is internal to seal 570. Depending on the ambient pressure (which may be the hydrostatic head or the pressure of well fluids within a well casing) and the pressure of hydraulic fluid within the system, the pressure in section 516' may be greater than or less than the pressure in section 516.

If the pressure within section 516' exceeds that within section 516, first section 572 of seal 570 will be pressure-energized by hydraulic fluid in cavity 579 to seal against the probe section of the male coupling member. Conversely, if the pressure within section 516 is greater than that within section 516', seawater or well fluids which may leak past seals 528, 529 and/or seal 540 and thereby enter cavity 579 will pressure-energize section 574 of seal 570 to seal more firmly against the probe section of the male coupling member.

Fluid pressure within internal cavity 579 will also act to urge curved back section 576 against circumferential wall 580 of the central axial bore. As back 576 moves in a radially outward direction towards wall 580, it causes first curved section 572 and second curved section 574 to rotate slightly thereby increasing the sealing pressure of seal 570 against shoulder 537 and the interior end of seal carrier 575—the end which abuts shoulder 535 of the central axial bore. This rotation may also act to increase the sealing effectiveness of seal 570 to the surface of the cylindrical probe section of a male coupling member seated within receiving chamber 516.

Pressure-energized seal 570 may be made of any suitable material. In one particular preferred embodiment, seal 570 is a metal seal. In other embodiments, seal 570 is fabricated from a natural or synthetic polymer. An engineering plastic such as polyetheretherketone (PEEK) or polytetrafluoroethylene (PTFE; Teflon™) may be molded and/or machined to fabricate seal 570. In certain embodiments, seal 570 may be plated or otherwise coated with a corrosion-resistant material to prolong the working life of seal 570 in the subsea environment. In one particular preferred embodiment, seal 570 is a metal seal plated with gold. Gold is both resistant to corrosion and relatively soft. A softer metal can deform under pressure to conform to surface irregularities on an opposing harder surface and thereby provide a better seal.

Although the invention has been described in detail with reference to certain preferred embodiments, variations and modifications exist within the scope and spirit of the invention as described and defined in the following claims.

What is claimed is:

1. A female hydraulic coupling member comprising:
   (a) a body having a first longitudinal bore, the first bore having adjacent first and second circumferential shoulders therein;
   (b) a retainer adapted to be inserted into a first end of the first longitudinal bore and to seat on the first shoulder, the retainer having a second longitudinal bore;
   (c) an annular probe seal having a generally C-shaped cross section within the first longitudinal bore interposed between the second shoulder and the retainer upon insertion of the retainer into the first longitudinal bore and oriented such that the opening in the C-shaped seal faces the longitudinal axis of the first bore, the seal comprising a first curved section and a second, opposing curved section such that when the probe section of a male hydraulic coupling member is inserted in the female hydraulic coupling member and contacts the probe seal, the first curved section of the probe seal is pressure-energized if the fluid pressure within the coupling exceeds the ambient pressure and second curved section of the probe seal is pressure-energized if the ambient pressure exceeds the fluid pressure within the coupling.

2. A female hydraulic coupling member as recited in claim 1 wherein the annular probe seal is a metal seal.

3. A female hydraulic coupling member as recited in claim 2 wherein the annular probe seal is a plated metal seal.

4. A female hydraulic coupling member as recited in claim 3 wherein the annular probe seal is a gold-plated metal seal.

5. A female hydraulic coupling member as recited in claim 1 wherein the annular probe seal comprises a molded polymer.

6. A female hydraulic coupling member as recited in claim 1 wherein the annular probe seal is comprises a machined, engineering plastic.

7. A female hydraulic coupling member as recited in claim 6 wherein the engineering plastic comprises polyetheretherketone (PEEK).

8. A female hydraulic coupling member as recited in claim 6 wherein the engineering plastic comprises polytetrafluoroethylene (PTFE).

9. A female hydraulic coupling member as recited in claim 1 further comprising a threaded portion in the first longitudinal bore and an externally-threaded retainer nut having a central, axial opening and configured to engage the threaded portion of the first longitudinal bore and hold the retainer on the shoulder.

10. A female hydraulic coupling member as recited in claim 9 further comprising an annular seal interposed between the retainer nut and the retainer.

11. A female hydraulic coupling member comprising:
    (a) a body having a first longitudinal bore, the first bore having adjacent first and second circumferential shoulders therein;
    (b) a retainer adapted to be inserted into a first end of the first longitudinal bore and to seat on the first shoulder, the retainer having a second longitudinal bore;
    (c) an annular probe seal having a first curved section, a second, opposing curved section and a curved back section joining the first curved section and the second curved section, the seal situated within the first longitudinal bore interposed between the second shoulder and the retainer upon insertion of the retainer into the first longitudinal bore and oriented such that an opening in the seal between the first curved section and the second curved section and opposite the back section faces the longitudinal axis of the first bore, the seal configured such that when the probe section of a male hydraulic coupling member is inserted in the female hydraulic coupling member and contacts the probe seal, the first curved section of the probe seal is pressure-energized if the fluid pressure within the coupling exceeds the ambient pressure, second curved section of the probe seal is pressure-energized if the ambient pressure exceeds the fluid pressure within the coupling and at least one of the curved sections is moved about an annular axis when fluid pressure within the seal causes the curved back section to move in a radial direction away from the central axis of the longitudinal bore.

12. A female hydraulic coupling member as recited in claim 11 wherein the annular probe seal is a metal seal.

13. A female hydraulic coupling member as recited in claim 12 wherein the annular probe seal is a plated metal seal.

14. A female hydraulic coupling member as recited in claim 13 wherein the annular probe seal is a gold-plated metal seal.

15. A female hydraulic coupling member as recited in claim 11 wherein the annular probe seal comprises a molded polymer.

16. A female hydraulic coupling member as recited in claim 11 wherein the annular probe seal is comprises a machined, engineering plastic.

17. A female hydraulic coupling member as recited in claim 16 wherein the engineering plastic comprises polyetheretherketone (PEEK).

18. A female hydraulic coupling member as recited in claim 16 wherein the engineering plastic comprises polytetrafluoroethylene (PTFE).

19. A female hydraulic coupling member as recited in claim 11 further comprising a threaded portion in the first longitudinal bore and an externally-threaded retainer nut having a central, axial opening and configured to engage the threaded portion of the first longitudinal bore and hold the retainer on the shoulder.

20. A female hydraulic coupling member as recited in claim 19 further comprising an annular seal interposed between the retainer nut and the retainer.

* * * * *